United States Patent [19]
Maxey

[11] 3,983,783
[45] Oct. 5, 1976

[54] SPIN-STABILIZED DISPENSER
[75] Inventor: Lyle A. Maxey, Dana Point, Calif.
[73] Assignee: The United States of America as represented by the Secretary of the Army, Washington, D.C.
[22] Filed: June 10, 1975
[21] Appl. No.: 585,634

[52] U.S. Cl. .............................. 89/1.5 F; 89/1.819; 102/7.2
[51] Int. Cl.[2] .......................................... F41F 5/02
[58] Field of Search.................. 102/7.2, 34.4, 37.6, 102/65.2; 89/1.5 F, 1.5 R, 1 F, 1 J, 1.808, 1.819

[56] References Cited
UNITED STATES PATENTS

| 1,721,704 | 7/1929 | Madaschi | 89/1 F |
| 2,785,632 | 3/1957 | Clauser et al. | 102/37.6 |
| 3,318,033 | 5/1967 | Barr | 102/65.2 X |
| 3,500,714 | 3/1970 | Cullinane | 89/1 R |
| 3,584,581 | 6/1971 | Flatau et al. | 102/7.2 X |

FOREIGN PATENTS OR APPLICATIONS

| 375,142 | 5/1923 | Germany | 102/65.2 |
| 924,690 | 5/1963 | United Kingdom | 102/37.6 |

Primary Examiner—David H. Brown
Attorney, Agent, or Firm—Nathan Edelberg; A. Victor Erkkila; Max Yarmovsky

[57] ABSTRACT

An aircraft munition dispensing cannister device utilizes a tubularly shaped central housing piston member, having a spline engagement dog thereon, to releasably engage a supporting helically splined mast. Spin is given to the cannister when the piston cannister is forcibly detached from the mast by expanding gases which are released from an explosive cartridge and are trapped intermediate the mast and the central housing member. Hot cartridge gases are vented into a passageway within the cannister to initiate a pyrotechnic delay train which subsequently actuates an explosive charge which aids in blowing apart the cannister sides and scattering the munitions.

3 Claims, 9 Drawing Figures

SPIN-STABILIZED DISPENSER

GOVERNMENTAL INTEREST

The invention described herein may be manufactured, used and licensed by or for the Government for governmental purposes without the payment to me of any royalty thereon.

BACKGROUND OF THE INVENTION

Various means have been used in the prior art to dispense munitions from low-flying, slow-moving aircraft. One of the problems encountered with prior art devices, such as those utilizing mechanically actuated gravity drop racks, has been the limited area of munition dispersion. Another problem with prior art aircraft dispensing devices has been that they were not easily jettisonable in case of in-flight emergency.

An additional problem encountered with prior art aircraft munition dispensers has been that they frequently malfunctioned while being handled or transported and thereby endangered friendly personnel.

SUMMARY OF THE INVENTION

The present invention relates to a spin-stabilized aircraft munition dispersion device. Munition dispersion is achieved in the present invention by spinning a piston type cannister filled with munitions off of a splined mast and then releasing the sides of the cannister, thus allowing the munitions to disperse and fall to the ground. The present device is fixed to a multi-use dispenser mounting pad rail which has a C shaped pocket for accepting a supporting mast for single or dual cannisters. The upper end of each mast has an integral head in the shape of a rectangular plate which lies in a plane normal to the mast axis. The width of the mast head is such that it fits snugly into a semicylindrical recess of the mounting pad rail. Each pad rail has a conical cavity on its lower surface which mates with a convex conical surface of a mast rail nut. When the mast rail nut is torqued upward the pad rail is locked intermediate the mast head and the mast rail nut. The mating conical surfaces of the rail and nut provide a positive lock and attachment for reacting against longitudinal, lateral and upward forces originating in the payload. Downward forces are reacted against by the head of the mast acting on the mounting pad. Cannister spin-up torque in the mast is reacted against by the lateral edges of the mast head acting on the sides of the C shaped pocket.

Cannister ejection from the mast is accomplished when a mast cartridge is fired producing gas pressure on a piston member which causes an integral spline engagement dog to follow the mast helical spline. The helical spline imparts spin to the cannister as it is ejected downwardly. The tangential speed of the submunitions, distributed in the cannister, is instrumental in dispersing the munition when the cannister is subsequently caused to burst by an explosive charge.

An object of the present invention is to provide an aircraft munition dispensing cannister which has a substantially wide dispersal area.

Another object of the present invention is to provide a spin-stabilized dispenser which is readily jettisonable in case of an in-flight emergency.

Another object of the present invention is to provide a spin-stabilized aircraft munition dispenser which is safe to handle and transport and will not function accidently due to extraneous electromagnetic radiation or electrical impulses.

Another object of the present invention is to provide a spin-stabilized aircraft munition dispenser which will require minimum field storage maintenance requirements.

Another object of the present invention is to provide a spin-stabilized aircraft munition dispenser which will have at least a 98% probability of reliably dispensing its load.

A further object of the present invention is to provide a spin-stabilized aircraft munition dispenser which is designed for ease of maintenance after each operational use.

For a better understanding of the present invention, together with other and further objects thereof, reference is made to the following descriptions taken in connection with the accompanying drawings.

BRIEF DESCRIPTION OF THE DRAWINGS

FIG. 9 is a partial cutaway longitudinal cross-sectional view of the

FIG. 9 is a partial cutaway longitudinal cross-sectional view of the cannister being separated from the assembly shown in FIG. 3.

Throughout the following description like reference numerals are used to denote like parts of the drawings.

DESCRIPTION OF THE PREFERRED EMBODIMENTS

Figure 1:
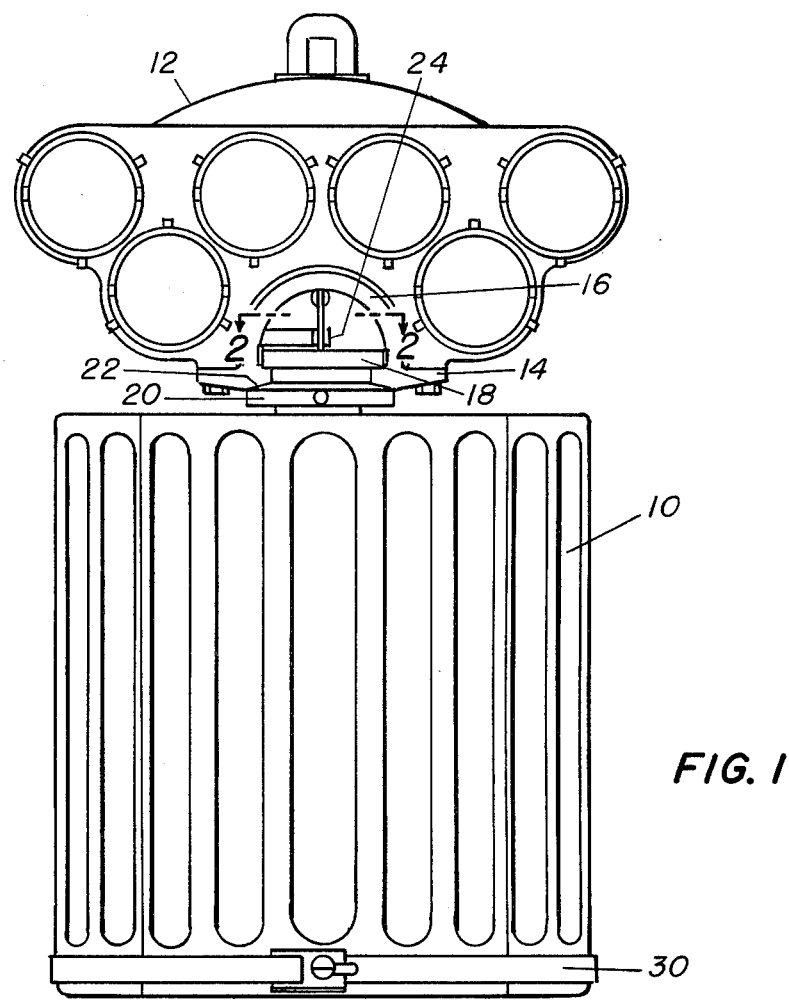
FIG. 1 is a front elevational view of the spin-stabilized dispenser assembly hung from a multi-use dispenser mounting pad rail.
Figure 2:
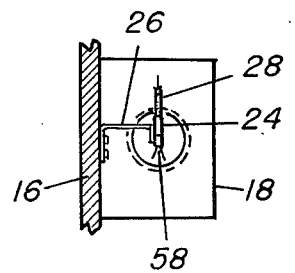
FIG. 2 is a partial cutaway cross-sectional view taken along line 2—2 of FIG. 1.

Referring now to FIGS. 1 and 2 a munition cannister or piston housing means 10 is supported on the underneath side of a multi-use dispenser 12. The dispenser 12 has a mounting pad 14 which has a C shaped rail pocket 16 therein for accepting the supporting mast rectangularly shaped plate head 18 of upper mast section 19. A mast nut 20, when screwed up against the lower conical pad surface 22, holds the mounting pad 14 fixedly positioned intermediate mast plate head 18 and mast nut 20. Electrical contact is made to the mast section 19 through contact 24 which is fixedly screwed to one side of rail 16. An electrical lead 28 coming from an aircraft electrical supply source (not shown) supplies energy to effect separation between the mast assembly and the cannister or piston housing means 10. While the cannister 10 or piston housing means is attached to the aircraft and being transported to a target area a pyrotechnic band release 30 holds the munitions (not shown) within the cannister or piston housing means 10.

Figures 3, 4:
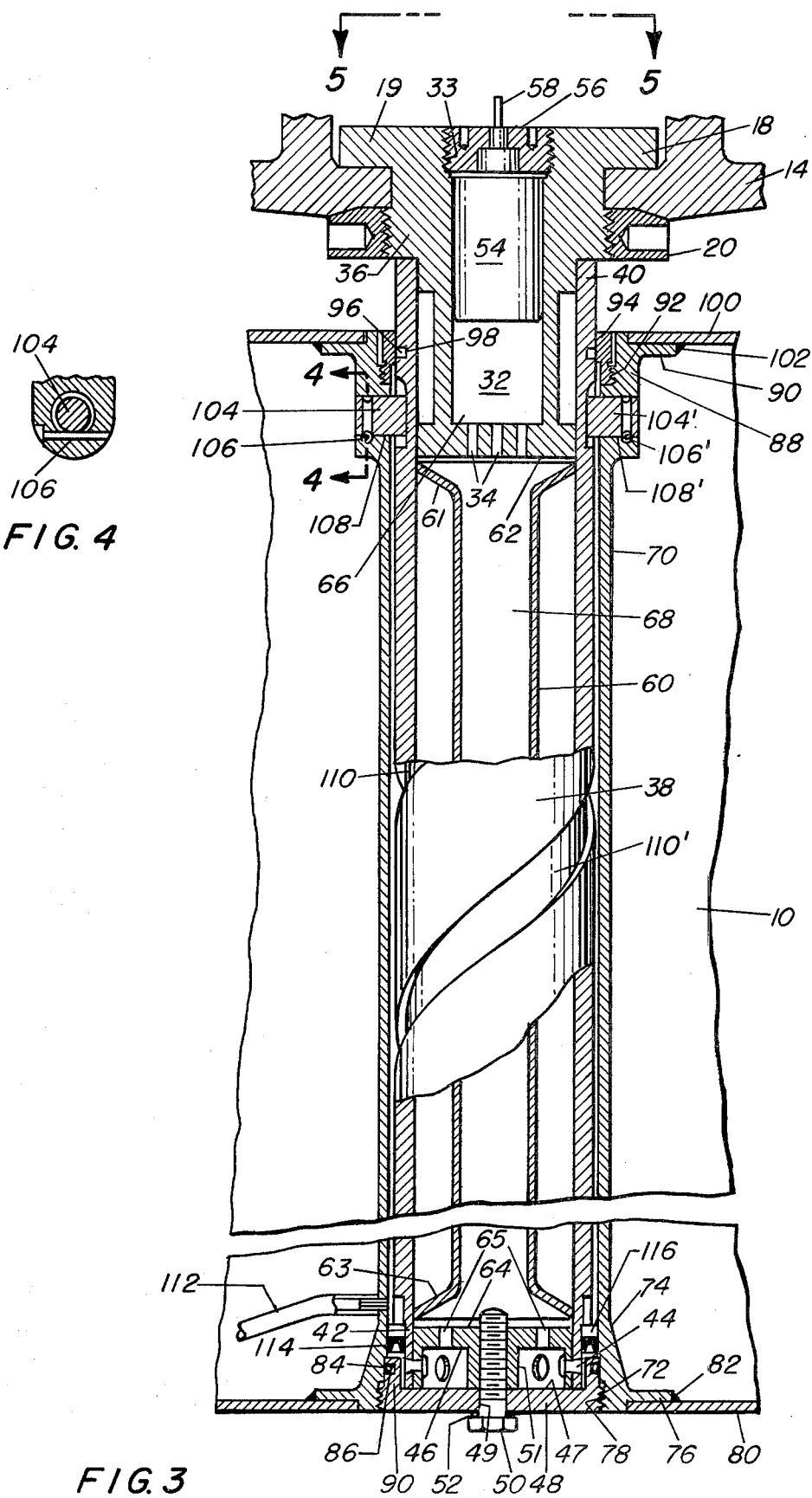
FIG. 3 is a longitudinal cross-sectional cutaway view of the mast assembly showing the mast and the central tubular section of the cannister.
FIG. 4 is a partial cross-sectional view taken along line 4—4 of FIG. 3.
Figure 5:
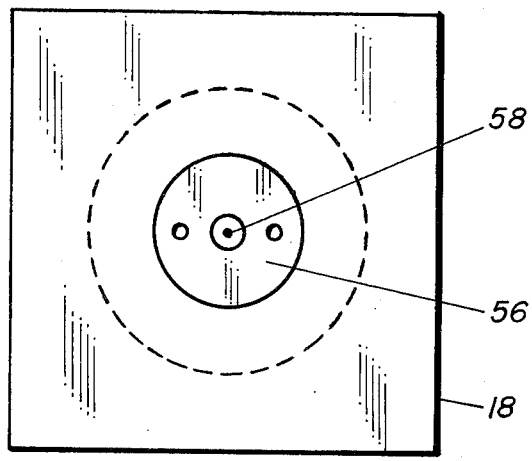
FIG. 5 is a top view taken along line 5—5 of FIG. 3.

Referring now to FIGS. 3-5 the mast comprises the rectangularly shaped mast head plate 18 which has an axial cartridge counterbore 32 therein. The upper end of the cartridge counterbore 32 communicates with an internally threaded cartridge nut counterbore 33. The lower end of the cartridge counterbore 32 communicates with a plurality of cartridge vent bores 34. The mast nut is threaded upon an externally threaded shoulder mast section 36. A hollow splined tubular mast section 38 is fixedly attached at its upper end 40 to mast shoulder 36 and at its lower end 42 by shear rivets 44 to a perforated cup shaped cannister support bulkhead 46. Cup shaped support bulkhead 46 is screwed to a cup shaped piston member 48 by means of cannister support bolt 50 which passes axially through the axially threaded bulkhead base 51 and piston member bolt bore 49. A static seal washer 52 is positioned intermediate the head of bolt 50 and the piston member 48 to prevent explosive gases from escaping around the threads and shank of bolt 50. An electrically activated cartridge 54 is fixedly positioned in counterbore 32 by a cartridge nut 56 which in turn permits a sngle electric cartridge contact lead 58 to protrude therethrough. A volume limiting tube 60 having flared ends 61 and 63 is fixedly positioned within the hollow helical spline mast member 38 intermediate the lower mast head end 62 and the upper side 64 of the cannister support bulkhead 46. The volume limiting tube 60 permits the high pressure explosive gases, which are generated in high pressure cartridge chamber 66, to exert initially enough pressure through low pressure chamber 68 against cannister cup shaped end piston member 48 and the upper side 64 of the bulkhead 46 to cut shear rivets 44. A central cannister tube member 70 has an internally partially threaded counterbore 72 on lower end 74. Lower end 74 has a torque flange 76 thereon. The threaded counterbore 72 is threadedly attached to the partially externally threaded peripheral surface 78 of cup shaped piston member 48. The torque flange 76 is fixedly attached to cannister bottom plate 80 by a weld 82. An O ring seal 84 is positioned in an annular O ring groove 86 in the wall 90 of cup shaped end member 48 to prevent the leakage of any of the expanding cartridge gases. The top end 88 of central cannister tube 70 has an integral top flange 90, which contains an axial internally threaded top counterbore 92 therein. A top cannister guide member 94 is threadedly affixed within the threaded top counterbore 92. A top O ring seal 96 is operatively positioned within top O ring groove 98 located in the outer peripheral surface of the spline upper end 40. The top cannister plate 100 is fixedly held to top flange 90 by weld 102. A pair of spline engagement dogs 104, 104' are fixedly held by a pair of dog retaining pins 106, 106' within the transversely positioned central cannister tube dog bores 108, 108' respectively so that dogs 104 and 104' slidably engage spline grooves 110, 110' respectively. The lower end 74 of the central cannister tube 70 has a tube 112 connected thereto which permits hot gases generated by the cartridge 54 to travel from the low pressure chamber to a pyrotechnic timer and cannister band release mechanism not shown. An annular O shaped piston pressure seal member 114 and a piston seal support washer 116 are positioned intermediate the cannister cup shaped piston member 48 and the lower end 42 of the spline 38.

Figure 6:
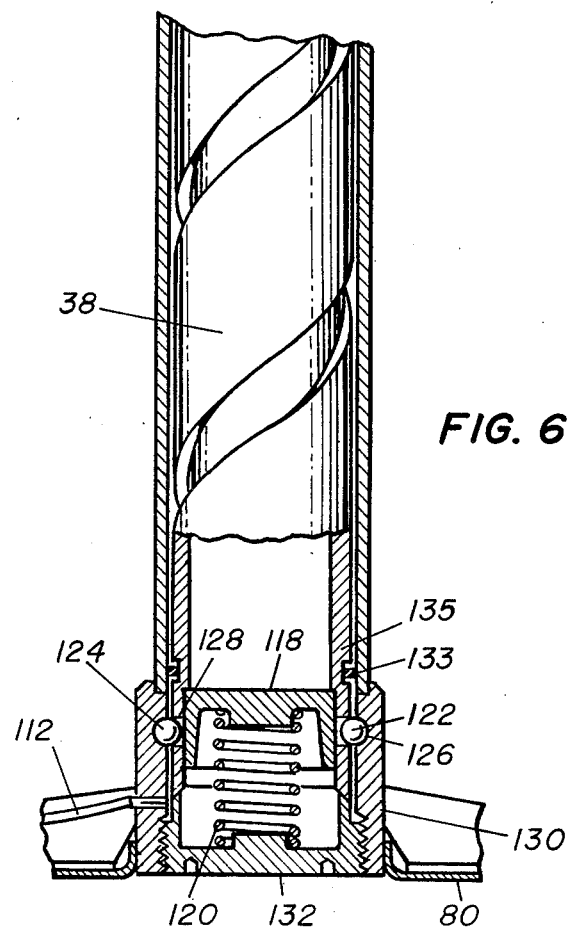
FIG. 6 is a longitudinal cross-sectional cutaway view of a first alternate embodiment of the cannister breakaway section.

Referring now to FIG. 6, the first alternate embodiment of the cannister break-away section, shows the device in a non-fired position. A piston member 118 is held in a locking position by a biased spring 120. The piston 118, in the position shown, holds two ball bearings 122 and 124 fixedly in retainer tube annular grooves 126 and mast annular locking groove 128, thus preventing the retainer tube 130 from slidably moving away from the mast 38. When cartridge 54, as shown in FIG. 3, is exploded hot gases under pressure force the piston 118 toward the bottom cup shaped cannister member 132 thereby releasing balls 122 and 124 from the grooves 126 and 128 respectively, so that the retainer tube 130 is forcibly spun downwardly away from the splined mast 38. A backup packing ring 133 located in annular packing groove 135 prevents the escape of gas into the cavity between the mast 38 and retainer tube 130.

Figure 7:
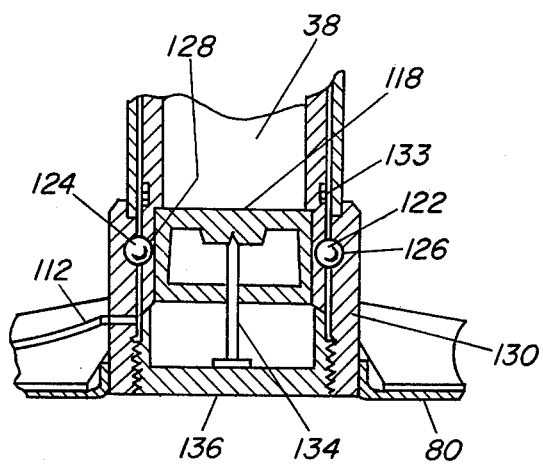
FIG. 7 is a cutaway view of a second alternate embodiment of the breakaway section of a spin-stabilized dispenser.

In a second alternate embodiment of the cannister break-away section, shown in FIG. 7, a compression collapse rod 134, positioned intermediate cannister support member 136 and piston 118 holds the piston member 118 in its ball-locking position. In a similar fashion as aforedescribed, when sufficient gas pressure from the exploded cartridge 54, shown in FIG. 3, is exerted against piston 118, the rod 134 collapses allowing the balls 122 and 124 to be released from grooves 126 and 128 respectively.

Figure 8:
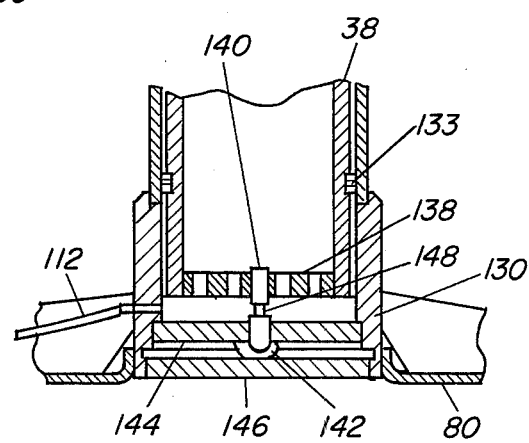
FIG. 8 is a third alternate embodiment of the breakaway section of a spin-stabilized dispenser.

Referring now to the third alternate embodiment of the cannister breakaway section shown in FIG. 8, the splined tubular mast 38 has a perforated disc 138 fixedly connected thereto. Disc 138 has a rod member 140, designed to fail in tension, axially located therein and fixedly attached thereto. Fixedly attached to the bolt head end 142 is a plate member 144. A nut closure member 146 is threadedly attached to retainer tube 130 which is in turn fixedly held to cannister bottom 80. An annular rod groove 148 is located in the middle of rod member 140 and is designed to fail in tension when sufficient gas pressure from the explosive cartridge 54 shown in FIG. 3 is exerted upon plate 144.

Figure 9:
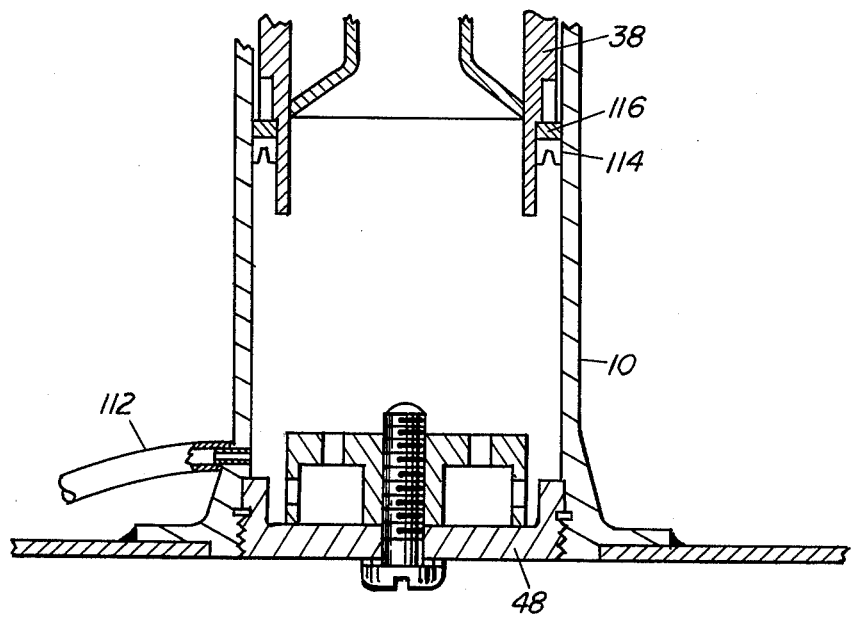

Referring to FIGS. 3 and 9 to ilustrate the operation of the preferred embodiment, when an electrical signal is delivered to contact 58, cartridge 54 is set off which generates gas under pressure in cartride high pressure chamber 66. The gas pressure expands through vent bores 34 down through the volume limiting tube 60 to the upper side 64 of the support bulkhead 46 through vent holes 65 to the top interior surface 47 of the cannister cup shaped end member 48 which acts as a piston. The gas pressure causes the rivets 44 to shear off and release the cannister 10 so that it is driven down and away from the mast spline 38. The two spline engagement dogs 104 and 104' slide within the helical spline grooves 110 and 110' to give the cannister 10 its spin. The gas seal member 114 and piston seal support washer 116 remain on the mast spline 38, as shown in FIG. 9, until the dogs 104 and 104' knock them off as the cannister 10 leaves the mast 38.

The foregoing disclosure and drawings are merely illustrative of the principles of this invention and are not to be interpreted in a limiting sense. I wish it to be understood that I do not desire to be limited to the exact details of construction shown and described for obvious modifications will occur to a person skilled in the art.

Having thus fully described the invention, what is claimed as new amd desired to be secured by Letters Patent of the United States is:

1. A spin-stabilized dispenser which comprises:

an upper mast section having a rectangularly shaped plate head thereon, said mast section having an internally threaded counterbore axially positioned in its upper end, a cartridge counterbore concentric with said threaded counterbore and communicating therewith, a plurality of vent bores communicating with said cartridge counterbore and exiting from the other end of said mast section, and an externally threaded shoulder section located below said plate head;

a hollow helical spline mast member having a pair of external helical grooves diametrically positioned in the circumference of said helical spline mast member, said grooves extending from a point below the upper end of said splined mast to a point above the lower end of said spline mast member, an annular top O ring groove positioned in the upper end of said spline mast member;

a top O ring seal positioned in said top O ring groove; and a volume limiting hollow tube having flared ends fixedly positioned within said splined mast;

piston housing means, releasably attached to said helical spline mast member, for holding munitions therein; and explosive means for initiating release of said piston housing means from said helical spline mast member.

2. A spin-stabilized dispenser as recited in claim 1 wherein said piston housing means comprises:

a hollow cannister central tube member having an internally threaded axial top counterbore therein, a top flange located on the top end of said cannister central tube member and a torque flange on its lower end, said top end having a pair of transversely positioned dog bores therein which are positioned in line with said pair of external helical grooves of said spline mast member, said lower end having an axial counterbore therein which is partially threaded;

a top cannister plate welded to said top flange;

a bottom cannister plate welded to said torque flange wherein said top and bottom cannister plates serve as the top and bottom covers of said spin-stabilized cannister;

a pair of spline engagement dogs fixedly positioned in said dog bores for slidably engaging said helical grooves;

an externally threaded tubularly shaped cannister top guide member threadedly fixed in the top counterbore of said cannister central tube member, wherein the inside bore of said guide member slidably engages said top O ring seal;

a partially externally threaded cup shaped piston member having an axial bore therein and O ring groove operatively located in the wall of said piston member which includes;

an O ring located in said O ring groove, wherein said O ring forms a hermetic seal between said piston member and the lower end of said cannister central tube member;

a cup shaped support bulkhead member having an internally threaded axial boss thereon, a plurality of vent holes passing therethrough permit said initial volume limiting tube member to communicate with said piston member;

a bolt passing through said axial bore of said piston member threadedly engages said threaded axial boss;

a plurality of shear rivets releasably holding said bulkhead member to the lower end of said splined mast;

an annular piston pressure seal member, having a U shaped cross section, slidably positioned intermediate said spline mast member and the lower end of said cannister central tube member;

a piston seal support washer operatively positioned intermediate the lower end of said splined mast and said U shaped piston pressure seal; and pyrotechnic band release means, pneumatically connected to said cannister central tube member, for permitting release of munitions from said piston housing means when said piston housing means is released from said helical spline mast member.

3. A spin-stabilized dispenser as recited in claim 1 wherein said explosive means comprises an electrically actuated cartridge fixedly positioned in the cartridge counterbore of said upper mast section.

* * * * *